United States Patent

[11] 3,549,089

| [72] | Inventor | Bruce E. Hamlett<br>Michigan City, Ind. |
|---|---|---|
| [21] | Appl. No. | 748,030 |
| [22] | Filed | July 26, 1968 |
| [45] | Patented | Dec. 22, 1970 |
| [73] | Assignee | The Hays Corporation<br>Michigan City, Ind.<br>a corporation of Indiana |

[54] METHOD AND MEANS FOR TRIMMING POSITION CONTROL MEMBERS
9 Claims, 4 Drawing Figs.

[52] U.S. Cl. .................................................. 236/15,
74/665, 431/12
[51] Int. Cl. .................................................. F23n 3/00
[50] Field of Search .......................................... 431/76, 12;
236/15E, 14; 74/(665A, B, C, D, E)(Inquired)

[56] References Cited
UNITED STATES PATENTS
| 3,074,644 | 1/1963 | Geniesse | 236/15E |
|---|---|---|---|
| 3,368,753 | 2/1968 | Baumgartel et al. | 236/15E |
| 3,369,748 | 2/1968 | DeLivois | 236/15E |

Primary Examiner—Frederick L. Matteson
Assistant Examiner—Robert A. Dua
Attorney—Eugene C. Knoblock ABSTRACT: A method and means for trimming position control members. The method entails adjustment of the linkage between one controlled element of a multiple element system and a control member therefor which responds to a master controller proportionally to measurement deviations of the output of the system from optimum state without interrupting control of said system by said master controller. The means utilized is a lever member journaled on a rotatable shaft of the control member and connected to said linkage spaced from said rotatable shaft. The lever member mounts a reversible positioning motor having a drive shaft, and a worm and gear connect said drive shaft and said rotatable shaft.

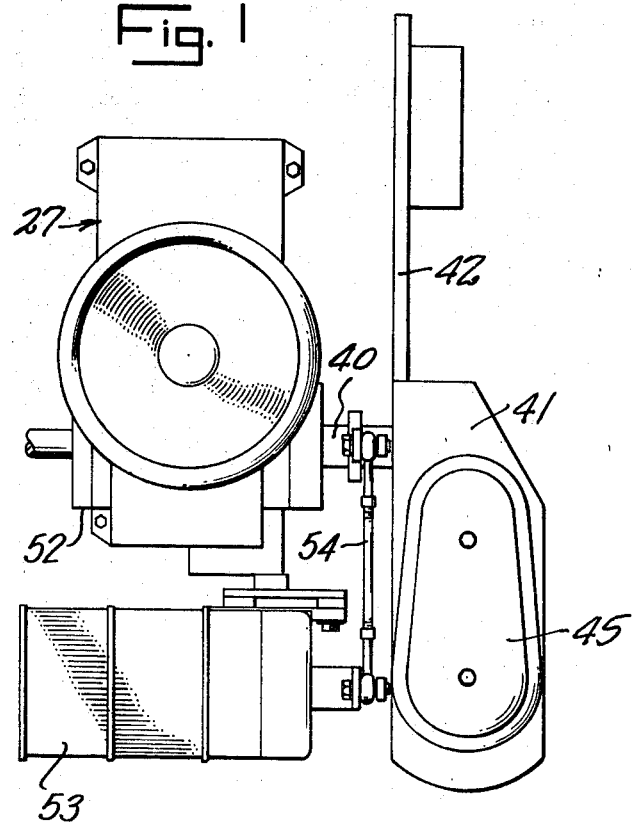
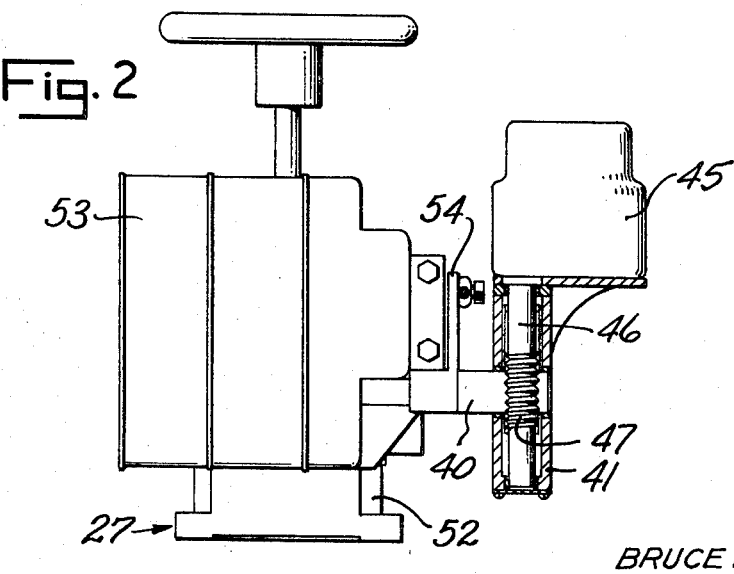

METHOD AND MEANS FOR TRIMMING POSITION CONTROL MEMBERS

This invention relates to a method and means for trimming position control members. The invention finds its greatest utility in combustion control systems, but also is useful in processes where vernier adjustment of a positioning device is required.

Position control members are used in various processes to control the positions of valves, dampers and other process control elements. The operation of the controlled element must normally be correlated by a master controller to the operation of elements controlling other functions in a process, and the ratio of functioning of the respective control members may not always be optimum, depending upon operating conditions of the system.

One example of the use of the method and means of this invention air," in connection with the combustion control systems of boiler plants. Thus, in a standard positioning type combustion control system, a fuel valve and air supply control means, such as dampers, are positioned in proportional response to variations in a master loading signal which is a function of the system output or of the variable being controlled, for example, the pressure of steam generated in the boiler. The master loading signal and the master controller simultaneously energize means for positioning a fuel supply means, such as a valve, and an air supply means, such as a damper, in a manner selected to provide a theoretically determined desired proportion of air and fuel required for efficient combustion in the furnace. It is usual practice in combustion controls to provide a supply ratio of fuel to air entailing the supply of some "excess air", i.e. an amount of air in excess of that actually required for combustion, in order to be sure that there will always be available in the furnace a quantity of air which is sufficient to support combustion of the fuel.

The operation of a furnace to maintain maximum efficiency commonly entails the measurement of the products of combustion, such as stack gases. Thus, it is common to analyze the products of combustion to determine the amount of oxygen therein, and thus to provide a direct indication of the amount of excess air admitted to the furnace. The presence of a substantial amount of excess air is indicative of a major heat loss in the combustion process and, hence, of an undesirably low operating efficiency. With present controls, such conditions are usually dealt with by attempting to change the setting governing the proportion of air and fuel supplied in response to the master controller. This is difficult to accomplish accurately.

It is the primary object of this invention to provide a method and means by which the air supply means or other position controlling member in a process may be adjusted accurately and by small increments without interrupting the functioning of the system in response to a master controller.

A further object is to provide means which is insertable in a connection between a position control unit and a controlled element and which is readily adjustable in response to a secondary signal without interference with response of the controlled element to a master controller.

A further object is to provide means which is insertable in a connection between a position control unit and a controlled element and which is readily adjustable in response to a secondary signal without interference with response of the controlled element to a master controller.

A further object is to provide a device of this character which permits vernier adjustment of a positioning device.

A further object is to provide a device of this character which accommodates adjustment of a positioning device and which is self-locking in selected adjustment after adjustment has been effected.

A further object is to provide a device of this character which can be installed in conjunction with positioning means in existing systems as well as in systems under construction.

Other objects will become apparent from the following specification.

In the drawings:

FIG. 1 is a top plan view of one embodiment of the mechanism incorporating this invention.

FIG. 2 is an end view of the mechanism shown in FIG. 1.

Figure 3:
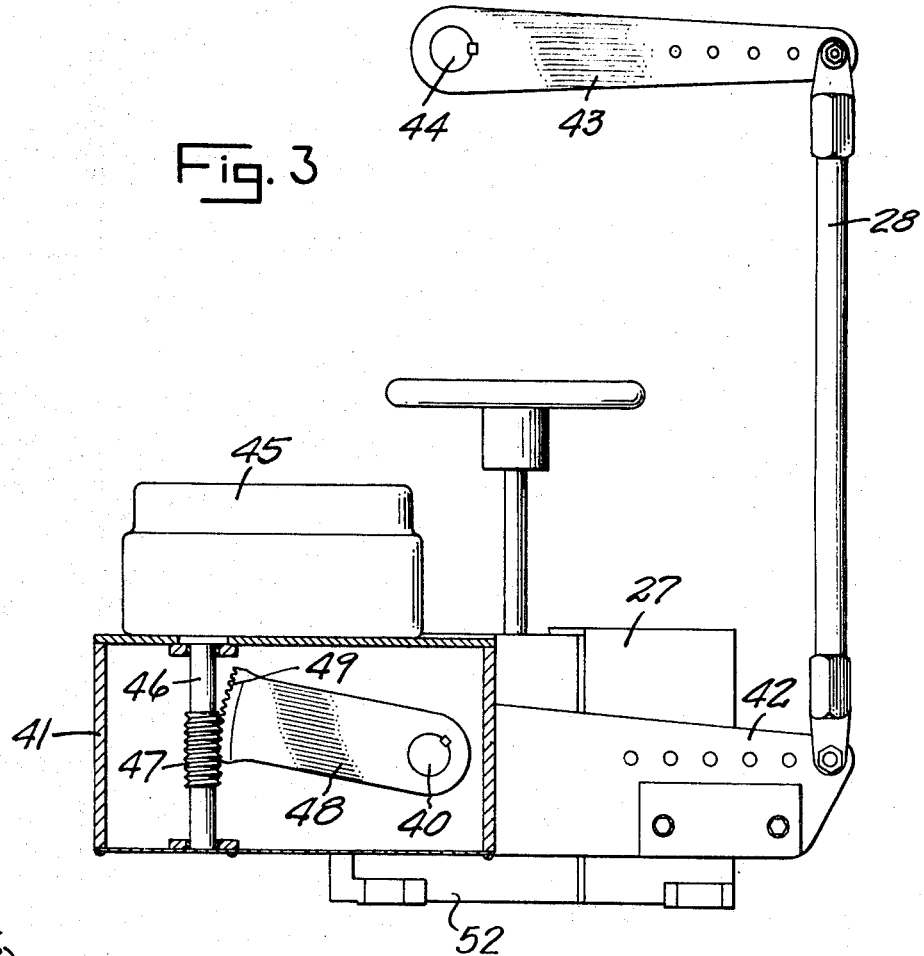
FIG. 3 is a view in side elevation of the mechanism shown in FIG. 1.

Referring to the drawings which illustrate a preferred embodiment of the invention, the invention comprises an adjustable member connected to a shiftable actuator element for controlling an adjustable element, such as an air damper, responsive to a master controller. The adjustable member is responsive to a secondary power actuated controller to accurately vary the orientation or relation of the controlled element to the master controller.

Figure 4:
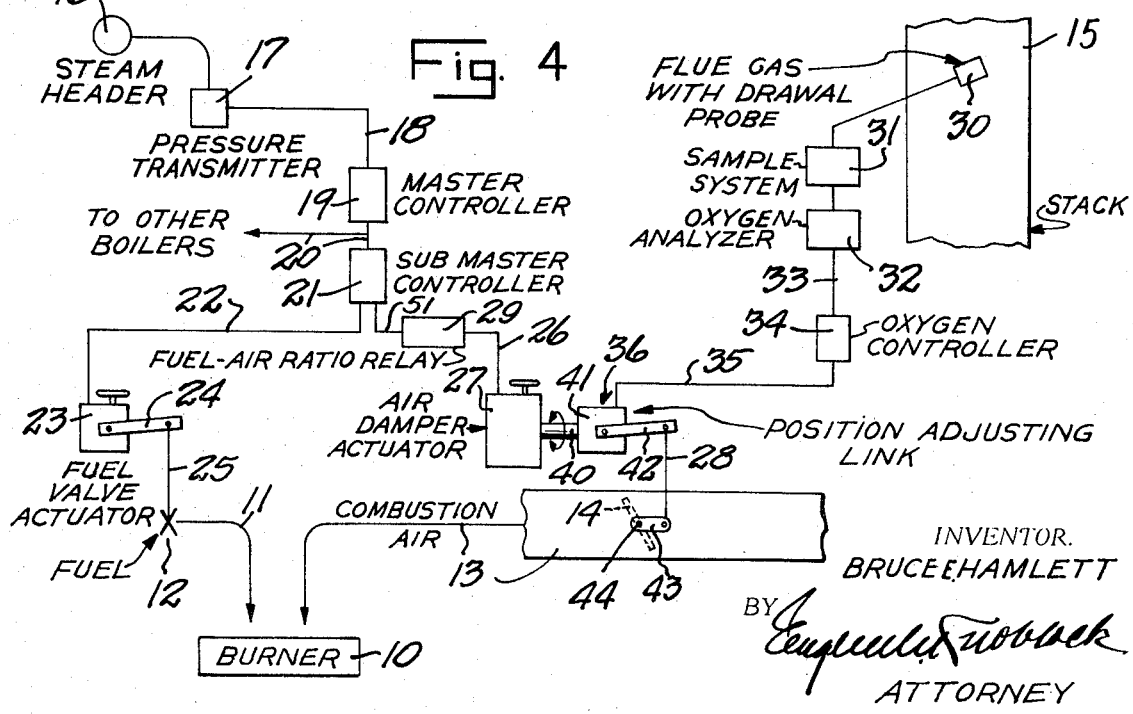
FIG. 4 is a schematic illustration of the application of the invention to a combustion control system.

One embodiment of the invention, in which it is applied to the control of the combustion system of a boiler, is illustrated schematically in FIG. 4. As shown, the system being controlled includes a burner 10 to which fuel is supplied by a line 11 under the control of a valve 12 and to which air is supplied through a duct 13 having a damper 14 and connected to a suitable blower or fan (not shown). The products of combustion of the burner 10 are discharged through a stack 15. The boiler (not shown) is heated by the burner 10 and includes a steam header 16.

Suitable pressure measuring means are associated with the steam header 16 and include a pressure responsive signal transmitter 17. The transmitter 17 may be connected, as by a line 18, with a master controller 19 to respond to or to be operated in accordance with the pressure signal generated by the transmitter 17. In the event a plurality of boilers are connected together, other boilers may be connected in the system by line 20 which is connected to the master controller 19. Submaster controller 21 is connected by a line 22 to a power operated reversible positioning unit or fuel valve actuator 23 having an adjustable member 24 connected by a link 25 to the fuel valve 12 to control the fuel valve. The submaster controller 21 is also connected by a line 51 to a fuel/air ratio relay or controller 29 and thence by line 26 with a power operated reversible positioning member or air damper actuator 27 which in turn is connected by linkage 28 to the damper 14.

The system just described serves through proper orientation of the master controller 19, the submaster controller 21 and the fuel/air ratio relay or controller 29 with the positioning members 23 and 27 to vary the rate at which fuel is fed through line 11 and air is fed through line 13 to the burner 10 in selected proportions to support combustion in the furnace.

The method of the present invention entails the use of means for sampling the flue gas in the stack 15, as by means of a gas withdrawal probe 30 connected with a gas sampling system 31 which in turn is connected to and supplies an oxygen analyzer 32. The oxygen analyzer 32 may be connected by line 33 with an oxygen controller 34 or may be observed to govern adjustment of oxygen controller 34 which is connected by a line 35 to my novel linkage unit 36 which is interposed between the damper valve actuator or positioning unit 27 and the linkage 28 connected to the damper to adjust the same.

The method which is entailed in this system is to control the two variable control elements 12 and 14 of the system through separate positioning members both operating in response to the signal of a master controller in such a manner that variations in the settings of the controlled elements 12 and 14 will be proportional according to a predetermined ratio upon any actuation of the master controller 19. A secondary controller 34 responds to or is adjusted in response to variations of a condition of the control system different from that to which the master controller 19 responds. In this case controller 34 responds to or is adjusted according to variations in the device for analyzing flue gas for oxygen content from an optimum reading, so as to function to change the orientation of the adjustable linkage 36 to the positioning member 27 in an accurate manner intended to produce an optimum operating condition. Thus the setting of the control member 14 is varied without varying the setting of the member 12, and without interrupting control of the system by the master controller. Once such an adjustment of a system through adjustment of linkage 36 occurs, the new settings or relations of the parts 12 and 14 are maintained until a need for further change thereof is detected by the oxygen analyzer and transmitted through the oxygen controller 34 to the adjustable linkage unit 36.

One embodiment of the positioning means and the adjustment linkage 36 is illustrated in FIGS. 1, 2 and 3. In this construction, the positioning means 27 includes a reversible positioning motor of any suitable character, preferably with speed reducer means, which responds to signals or impulses transmitted through line 26 from fuel/air ratio controller 29. The motor 52 of the positioning member 27 includes an output shaft 40 on which is journaled one end of a housing 41. An elongated arm 42 is secured to and projects from the housing 41 and cooperates with housing 41 to form a lever which is connected through linkage 28 to an actuating arm 43 secured to a shaft 44 journaled in the duct 13 and mounting the damper 14.

The housing portion 41 of the lever mounts thereon a secondary reversible positioning or trimming motor 45 which preferably includes reduction gearing and which has a driven shaft 46 projecting therefrom and journaled in the housing 41 spaced from the shaft 40. The shaft 46 includes a worm gear 47. The shaft 40 has keyed thereto one end of an arm 48 whose free end 49 is toothed to form a gear sector which meshes with the worm gear 47. The size of the housing 41 is correlated to the arcuate dimension of the gear sector 49 so as to accommodate a predetermined angular rocking action of the arm 48 within the housing 41. If desired, suitable means (not shown), such as limit switches, may be positioned in the housing 41 to be actuated by lever 48 as the latter approaches its extremes of movement and which may function to stop operation of the trimming motor 45 at a selected limit position in each direction of operation thereof.

Attached to positioning member 27 is a potentiometer 53 which is mechanically connected by linkage 54 to shaft 40. Potentiometer 53 may be operatively connected to controller 29 and is responsive to the rotational position of shaft 40 so as to relay a feedback signal to controller 29 and thus enable the controller to sense the position of shaft 40.

The operation of the trimming motor 45, as in response to a signal transmitted through the oxygen controller 34, serves to rotate the shaft 46 in selected direction, it being understood that the trimming motor 45, like the motor of the positioning member 27 is reversible. Motor 45 functions in a direction determined by the nature of the variation of the oxygen content of the flue gas which is measured by the oxygen analyzer 32 and which causes or is read to determine the setting of the oxygen controller 34. Thus, as viewed in FIG. 3, rotation of the shaft 46 of the trimming motor 45 in one direction will result in lowering of the housing 41 or rocking thereof counterclockwise relative to the shaft 40 as viewed in said FIG., while the projecting arm 42 rocks upwardly counterclockwise relative to the shaft 40. In this way the arm 42, the link 50 and the actuating arm 43 of the damper are moved in response to operation of the trimming motor 45, and independently of the primary positioning member 27 which remains stationary under the sole control of the master controller 21. Conversely, rotation of the trimming motor 45 in the opposite direction will cause the housing 41 to be rocked on the shaft 40 in a clockwise direction, causing upward swinging thereof relative to said shaft while the arm 42 is lowered by a movement in a clockwise direction, also independently of the positioning motor 27. In this manner, adjustment of the connection between the damper 14 and the positioning member 27 which responds to the master controller 21 can be varied at will within a predetermined range which can be selected according to the requirements of the system. Thus, in a unit intended for the control of the supply of air to a combustion system, it has been found that a rocking action of ± 9° will provide an adequate range of variation to compensate for the range of excess oxygen likely to be encountered in a combustion system.

It will be observed that the linkage or trimming adjusting link will maintain any position in which it is placed as soon as operation of the trimming motor stops, by reason of the worm and gear connection 47, 49. In other words, when the shaft 46 of the motor 45 stops, the parts are held in a stopped position because of the interengagement of the gears 47 and 49, and this adjustment is maintained until the next functioning of the trimming motor 45 occurs.

One of the important considerations of this device is that the unit, including parts 41, 45 and 42, can be connected in any existing control system, thus rendering the device readily installable in existing systems and not limiting its use to systems originally designed and constructed to include it.

It will be observed that when applied to a combustion system, as here illustrated, the device provides means for changing the setting of a damper independently of a change of setting of the fuel supply and independent of operation of a master controller 21. Thus, if a variation in the amount of excess air in the flue gas occurs from the optimum or desired amount of such excess air, a signal may be transmitted from the oxygen controller 34 to cause functioning of the trimming motor 45 in a corrective sense or direction without interfering with the functioning of the combustion system or its control by the master controller. Hence, the combustion system can be operated at all times to provide a sufficient amount of air to insure complete combustion of fuel and to avoid the supply of air in such excess as to cause undesired heat loss and lowered operating efficiency of the furnace.

While the preferred embodiments of the invention have been illustrated and described, it will be understood that changes in the construction may be made within the scope of the appended claims without departing from the spirit of the invention.

I claim:

1. The method of trimming the position of a control member for a controlled element of a system, which control member includes an actuator which responds to a signal of the master controller for the system, consisting of the steps of:
   measuring a condition of the system which is variable with changes in the position of the control member; and
   varying the position of said control member to change the measured condition of the system independently of said master control signal and of said actuator.

2. The method of claim 1, wherein said system constitutes a combustion unit having a fuel control member and an air control member each responding to said master controller, said actuator forming part of said air control member, and wherein the relation of said air control member to the signal of said master controller is varied independently of said actuator in response to variations in the measurement of air in the products of combustion of said combustion unit.

3. Position trimming means used in conjunction with linkage means connecting a controlled element with a primary power actuated positioning unit having a rotatable linkage actuating shaft, comprising a member rotatable on said linkage actuating shaft and including a part connected to said linkage means spaced from said shaft, a second power actuated reversible positioning unit carried by said member and having a driving shaft spaced from said first shaft, and gearing connecting said shafts for varying the rotative position of said member and said linkage connecting part relative to said first shaft in response to actuation of said second positioning unit and for causing rotation of said member and movement of said linkage connecting part in response to rotation of said first shaft.

4. Position trimming means as defined in claim 3, wherein said gearing is of the meshing worm and gear type.

5. Position trimming means as defined in claim 3, wherein said gearing includes a worm gear on said driving shaft and an elongated member on said first shaft including a gear segment meshing with said worm gear.

6. Position trimming means as defined in claim 3, wherein said member comprises a housing journaled on said first shaft, said driving shaft extending into said housing, and said gearing being enclosed in said housing.

7. In combination, position trimming means adapted to be interposed in linkage means connecting a controlled element with a power actuated controller having a rotatable linkage actuating shaft, a lever member adapted for journaling on said linkage actuating shaft and connectable to said linkage means spaced from said shaft, a power actuated reversible positioning unit carried by said lever member and having a driving shaft, and meshing gear means having one part carried by said driving shaft and having another part connected to said linkage actuating shaft.

8. The construction defined in claim 7, wherein said gear means includes a worm gear on said driving shaft and a gear sector connectable to said linkage actuating shaft and meshing with said worm gear.

9. The construction defined in claim 7, wherein said gear means includes parts connectable to said linkage actuating shaft and engageable with said lever member to limit rocking of said lever member on said linkage actuating shaft.